United States Patent [19]

Itani

[11] 4,393,516

[45] Jul. 12, 1983

[54] DATA TRANSMISSION SYSTEM AND METHOD

[75] Inventor: Abdallah M. Itani, Ballston Spa, N.Y.

[73] Assignee: Electric Power Research Institute, Inc., Palo Alto, Calif.

[21] Appl. No.: 19,114

[22] Filed: Mar. 9, 1979

[51] Int. Cl.$^3$ ............................................. H04B 9/00
[52] U.S. Cl. .................................. 455/608; 370/105; 375/106; 375/120; 455/619
[58] Field of Search ....................... 250/199; 178/69.1; 325/58, 63; 179/15 BS; 455/608, 619; 370/105; 375/106, 120

[56] References Cited

U.S. PATENT DOCUMENTS

| | | | |
|---|---|---|---|
| 3,188,569 | 6/1965 | Mahony | 178/69.1 |
| 3,193,801 | 7/1965 | Grondin | 178/69.1 |
| 3,697,690 | 10/1972 | Aaron et al. | 178/69.1 |
| 3,758,720 | 9/1973 | Dinn | 325/58 |
| 4,017,683 | 4/1977 | Pederson et al. | 178/69.1 |
| 4,019,048 | 4/1977 | Maione et al. | 455/608 |

OTHER PUBLICATIONS

Houston—New Techniques for Current and Voltage Measurement on Power Transmission Lines—Publ. Gen. Elec. Co. May 1977 Rep. #77CRD111.

*Primary Examiner*—Joseph A. Orsino, Jr.
*Attorney, Agent, or Firm*—Flehr, Hohbach, Test, Albritton & Herbert

[57] ABSTRACT

A data transmission system and method is provided for transferring digital information which has been converted to a multiframe format of serial bits over a single optical cable. The mutliframe format used by the system includes sequential data frames each containing a sequence of bits at a bit frequency, of which a certain number are data bits containing the digital information. The data frames are transferred by way of the optical cable to a receiver. In the receiver a clock signal is generated by a variable oscillator which operates at a frequency substantially equal to the bit frequency. Circuitry responsive to the bits maintains a predetermined phase relationship between the clock signal from the oscillator and the bits. Decoder circuitry receives the transmitted bits and decodes the bits to retrieve the digital information using the clock signal from the oscillator. The method of retrieving the digital information from the above-described multiframe format, after having been transferred over the single optical cable, includes the following steps: A clock signal is generated having a frequency substantially equal to the bit frequency. A predetermined phase relationship is maintained between the clock signal and the bits. The clock signal is then used to select the data bits from the sequence of bits in the data frames and to retrieve the digital information from the data bits.

19 Claims, 3 Drawing Figures

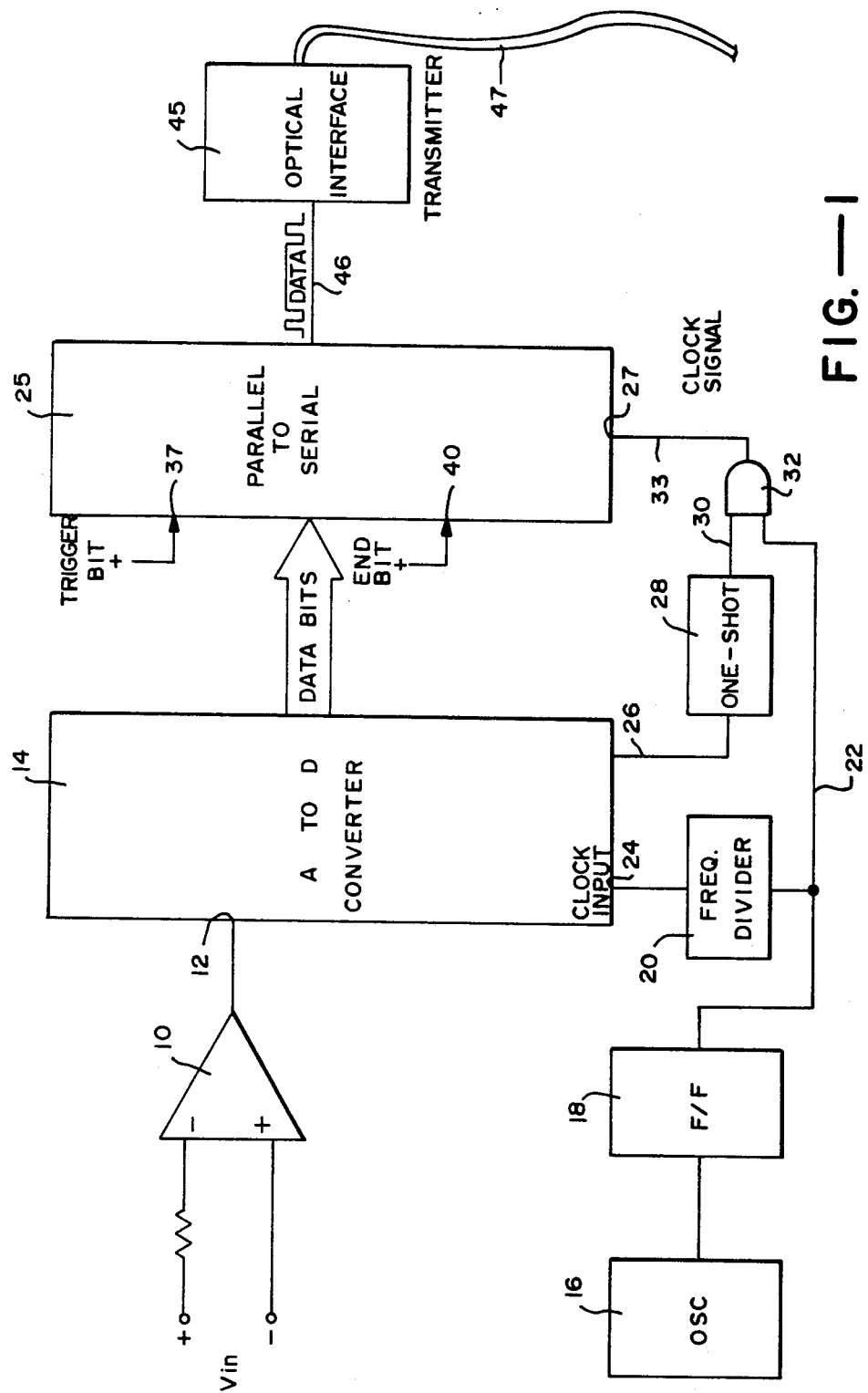
FIG.—1

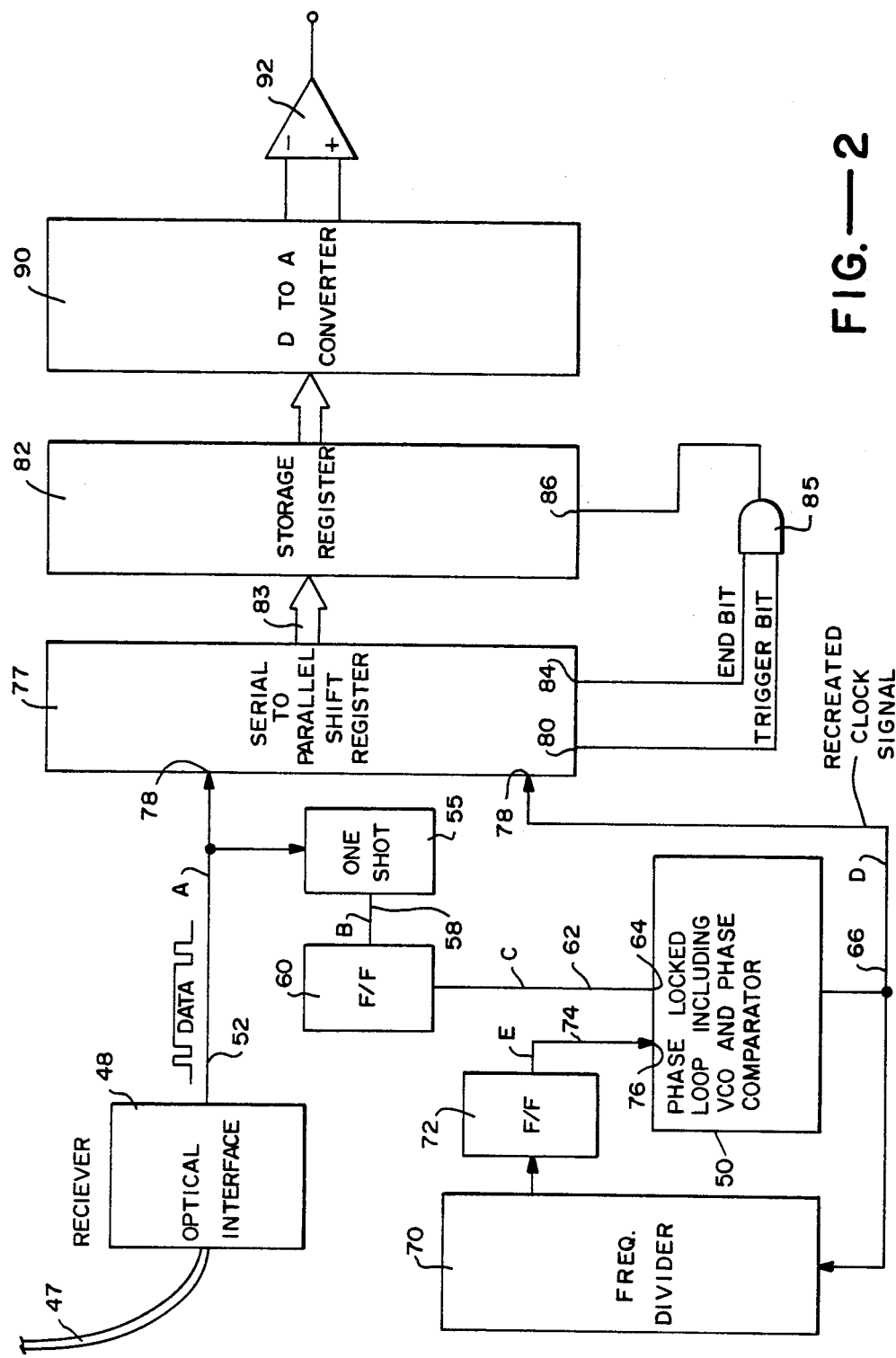
FIG.—2

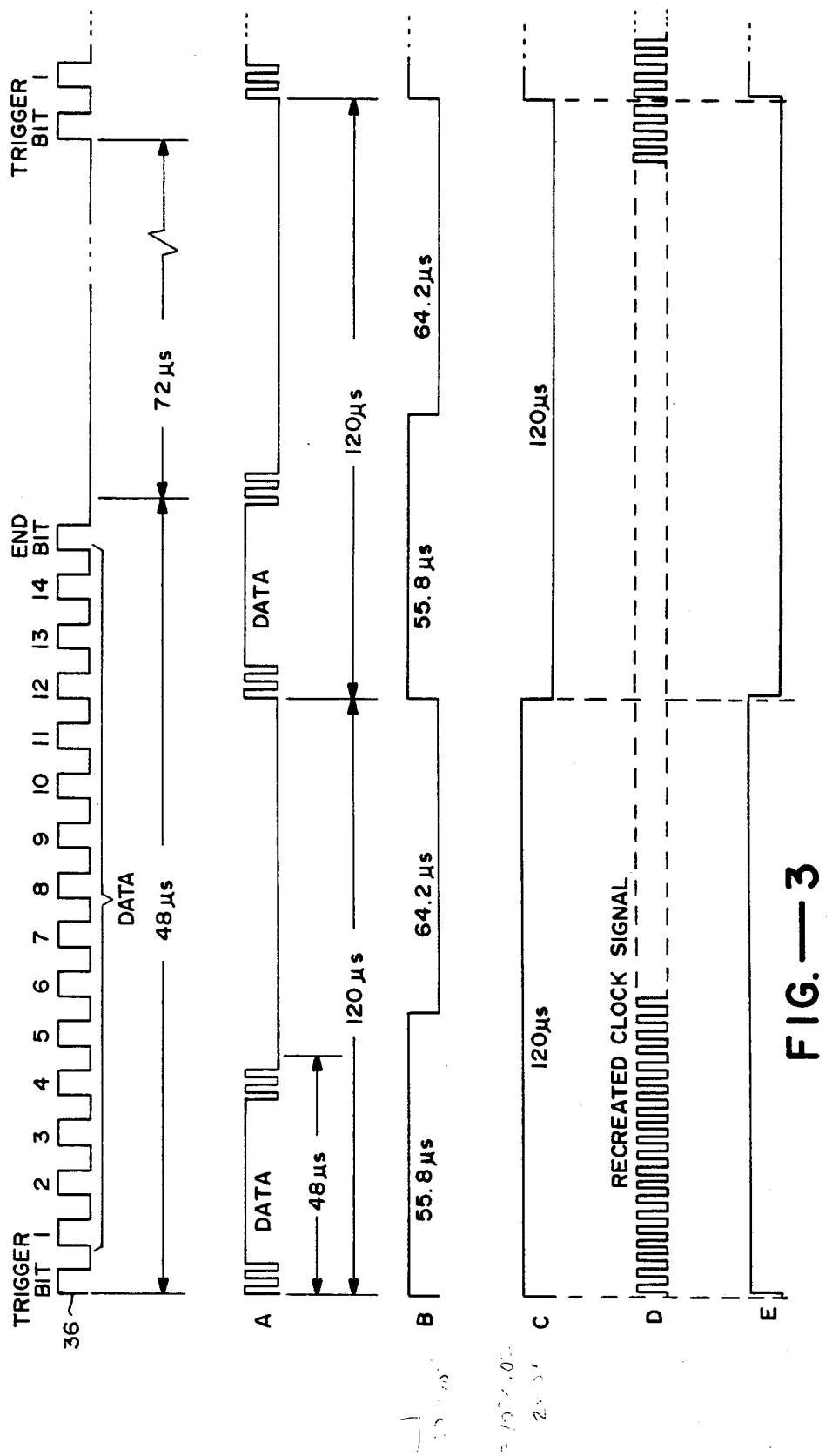
FIG.—3

DATA TRANSMISSION SYSTEM AND METHOD

The invention relates generally to systems for transferring information over a single transmission line and more particularly to a system for transferring digital information over a fiber-optic cable.

The use of fiber-optic cables for the transmission of information is particularly desirable where a high degree of electrical isolation is required. One practical application of fiber optics for data transmission is in monitoring line current on high voltage power transmission lines. In such systems, the current measuring device—a low impedance shunt on direct current lines, for example—is connected to the transmission line and is isolated from ground by large insulators or the like. The current measurement information is transmitted to a nearby monitoring station via optical cables, thereby isolating the monitoring station from line potential. A paper describing such a system entitled "New Techniques for Current and Voltage Measurement on Power Transmission LInes", by J. M. Houston et al. was published by the General Electric Company in May of 1977, Report No. 77 CRD 111. The Houston et al. paper describes a system in which an analog voltage proportional to line current is first converted to digital form for transmission over a pair of optical cables to a receiving station, where the analog value is recreated.

The two-cable system described in the Houston et al. paper offers continuous real-time monitoring of the line voltage. One optical cable carries an encoded data signal which is continuously updated and the second cable carries a clock signal for decoding the data signal at the monitoring end. It would be advantageous to eliminate the second cable carrying the clock signal, and thereby reduce the overall cost of the system. In eliminating the second cable, however, measurement resolution should not be sacrificed and there can be no substantial increase in the power consumption of the measurement transmitter unit. The latter constraint results from the fact that low power for a monitoring unit is difficult to extract from high voltage DC transmission lines. For this reason, any single-cable system should preferably avoid using convention bi-phase clocking systems in which numerous additional optical pulses are interspersed with the data pulses for clocking purposes.

It is an object of the present invention to provide a data transmission system and method for transferring digital information over a single optical cable.

It is another object of the invention to provide a data transmission system and method for transferring digital information over a single optical cable in a multiframe format of serial bits which requires no separately-transmitted clock signal.

It is another object of the present invention to provide a data transmission system and method suitable for continuous real-time monitoring of high voltage power transmission lines from a remote location.

Accordingly, a data transmission system is provided for transferring digital information which has been converted to a multiframe format of serial bits over a single optical cable. The multiframe format includes sequential data frames, each containing a sequence of bits having a predetermined bit frequency, and including a predetermined number of data bits containing the digital information. The system includes an optical encoder for converting the bits into a single optical signal for transfer by way of the optical cable and an optical decoder for receiving the optical signal and for reproducing the bits. Means for retrieving the digital information from the data bits comprises clock means, including a variable oscillator outputting a clock signal having a frequency substantially equal to the bit frequency. The clock means is responsive to the transmitted bits to produce a predetermined phase relationship between the clock signal and the bits. The system further comprises frame decoder means for selecting the data bits from the sequence of bits in each data frame using the clock signal.

The method for transferring digital information using the above system, in which the bits have been encoded into a single optical signal for transfer and then received and decoded to reproduce the bits, comprises the following steps: generating a clock signal having a frequency substantially equal to the bit frequency of the bits in each data frame and also having a predetermined phase relationship with respect to the bits. Then using the clock signal to select the data bits from the sequence of bits in each data frame to retrieve the digital information.

A preferred embodiment of the invention is described in detail below, with reference being made to the accompanying drawings, in which:

FIG. 1 is a block diagram of the transmitter portion of a data transmission system according to the present invention.

FIG. 2 is a block diagram of the receiver portion of a data transmission system according to the present invention.

FIG. 3 is a timing diagram illustrating several parameters in the circuitry of FIGS. 1 and 2 and showing generally the form in which the digital information is transferred by the method of the present invention.

FIGS. 1 and 2 show illustrative circuitry for transmitting digital information over a single optical cable according to the method of the present invention. The transmitter shown in FIG. 1 is associated with a type of analog measuring device (not shown) such as a low impedance shunt for measuring line current on a high voltage DC power transmission line. The circuitry of FIG. 1 takes the analog value and converts it to a multiframe digital format for transfer over a single optical cable to the receiver shown in FIG. 2.

Referring to FIG. 1, an analog input voltage $V_{in}$ from the low impedance shunt is input into a conventional operational amplifier 10, which then feeds the amplified analog signal to the input 12 of analog-to-digital converter 14. Converter 14 is a conventional fourteen bit A to D converter such as Model 149-14B manufactured by Datel. The clock input for converter 14 is supplied by an external oscillator 16 through flip flop 18 and frequency divider 20. Oscillator 16 is set to operate at a frequency of 666.66 Kilohertz (KHz) which is halved by flip flop 18 to yield a 333.33 KHz square-wave signal on line 22. A frequency divider 20, which is a conventional 8520 counter, divides the signal on line 22 by a factor of forty, delivering a pulse to clock input 24 of A to D converter 14 every 120 microseconds. The clock pulse at input 24 signals converter 14 to begin a conversion cycle.

A to D converter 14 processes the analog input signal and outputs fourteen data bits as they are generated to a parallel to serial shift register 25 over a parallel data bus. In the preferred system, parallel to serial shift register 25 comprises a pair of 54165s which output serial bits in response to clock pulses arriving at input 27. Each time a conversion is completed in A to D converter 14, an "end of convert" signal is output on line 26 into a 9602 one-shot 28, which produces a pulse of 48 microseconds duration on line 30. The signal on line 30 is supplied to an AND gate 32, with the other input to the AND gate being the clock signal on line 22. The length of the clock pulses on line 22 is 3 microseconds (333.33 KHz signal) and AND gate 32 passes exactly 16 clock pulses on line 33 every 48 microseconds. The signal on line 33 is supplied to the clock input 27 of parallel to serial shift register 25.

A 16-bit data train is assembled in parallel to serial shift register 25, comsisting of a trigger bit, fourteen data bits from A to D converter 14, and an end bit. Trace 36 in FIG. 3 illustrates the form of the serial output of parallel to serial shift register 25. A trigger bit is added before the fourteen data bits by maintaining a first trigger pin 37 always high. The next sequential input pins of the parallel to serial shift register 25 are supplied from A to D converter 14. An end bit is also added to the pulse train by maintaining the 16th input pin 40 always high.

The transmitter shown in FIG. 1 operates to convert the analog value $V_{in}$ into a pulse train as follows: Every 120 microseconds a "convert" command is supplied to clock input 24 of A to D converter 14. The converter is cleared and begins producing the fourteen bit output at approximately 1 bit every 3 microseconds, as determined by the internal clock of the Datel 149-14B. During conversion, the output on line 26 remains high and is extended to 48 microseconds by one-shot 28. Clocked by the signal on line 33, parallel to serial shift register 25 begins outputting the serial bits beginning with a trigger bit, followed by the fourteen data bits, and ending with an end bit. The process is repeated every 120 microseconds, which represents the duration of a data frame. Trace A in FIG. 3 shows the form of the output of parallel to serial shift register 25. The process converts the digital information from the A to D converter to a multiframe format of serial bits, with the data being updated for each (120 microsecond) data frame.

The output of parallel to serial shift register 25 is supplied to an optical transmitter 45 over line 46. Optical transmitter 45 includes an optical encoder for converting the bits into a single optical signal for transfer by way of an optical cable 47. A suitable device for this purpose would include high intensity LEDs coupled to one or more fiber optic strands to provide a modulated optical signal. Where the system is to be used for high voltage monitoring, the optical cable is run to a nearby monitoring station and coupled to an optical decoder for receiving the optical signal and reproducing the bits transmitted. The optical cable can extend for distances of hundreds of yards, providing adequate isolation from the high voltage line at a convenient monitoring station. The optical interfaces and cable can be of any commercially-available type, for example a system manufactured by Corning, Model 1MH3. The optical decoder portion 48 of the optical interface between transmitter and receiver is shown in FIG. 2.

Referring to FIG. 2, the system receiving unit of the present invention provides means for retrieving the digital information produced by the transmitter of FIG. 1. Optical decoder 48 receives the optical signal on cable 47 and reproduces the multiframe data signal transmitted. Trace A of FIG. 3 gives an example of the reproduced signal consisting of a series of sequential data frames of 120 microseconds duration, with sixteen bits in each data frame. The bits have a predetermined bit frequency of 333.33 KHz and include fourteen data bits in which the digital information is contained. Each frame also includes approximately 72 microseconds of blank space which is used in synchronizing the clock signal in the receiving unit, as described more fully below.

In order to retrieve the digital information in the fourteen data bits in each data frame, it is necessary to have a clock signal synchronized with the bits as they arrive. The present invention includes clock means incorporating a voltage controlled oscillator (VCO) for this purpose. Box 50 is a conventional 564 phase locked loop incorporating a VCO and a phase comparator. The VCO output is synchronized with the incoming data bits by circuitry for sensing the start of each data frame and for adjusting the VCO to produce a predetermined phase relationship between the clock signal output and the data bits. The beginning of each frame is marked by the trigger bit, which signals a 9602 one-shot 55 serving as a frame trigger. The 9602 outputs a single pulse of 55.8 microseconds duration on line 58, as shown in Trace B of FIG. 3, and hence delays sensing any additional bits for that period. The pulse is fed into a flip flop 60, which outputs a signal on line 62 having a frequency equal to the frequency of the data frames on line 52. Trace C in FIG. 3 shows the output of flip flop 60. Line 62 is fed to one of the input pins 64 of box 50 (the phase locked loop incorporating the VCO).

The VCO is set to operate at a frequency substantially equal to the bit frequency (333.33 KHz) of the bits in each data frame. The frequency is adjusted slightly to maintain a predetermined phase relationship between the clock signal output of the VCO and the frequency of the bits on line 52. The clock signal from the VCO appears on line 66, and is reproduced in Trace D of FIG. 3. The frequency of the VCO is monitored by supplying the clock signal to circuitry for determining measured frame intervals. A frequency divider 70 consisting of a pair of 8520s reduces the clock signal frequency by a factor of 40. After passing through a pulse-shaping flip-flop 72, the signal becomes a measured frame interval (see Trace E) with a frequency substantially equal to the sensed frame intervals on line 62 (Trace C). The measured frame intervals on line 74 are fed to a second input pin 76 of the 564 phase locked loop. Frequency divider 70 and flip flop 72 together constitute frame interval means for determining the measured frame intervals of Trace E. In comparing Traces C and E of FIG. 3, it can be seen that the measured frame intervals are substantially equal in length to the sensed duration of each data frame represented by the signal on line 62 (Trace C). The only difference is a slight phase differential which is inherent in the output of VCO 50 and is useful in later signal processing. The clock signal on line 66 is delayed in phase approximately 90° from the bits on line 52. This phase differential will be reflected in the signals arriving at input pins 64 and 76 of the phase locked loop. The output frequency of the VCO is adjusted internally in response to the signals arriving at pin 64 and 76 to maintain the proper phase relationship between the clock signal and the bits.

The data on line 52 is supplied to additional circuitry which selects the data bits from the sequence of bits in each frame and then reproduces an analog signal for display and monitoring purposes. A serial to parallel shift register 77 first receives the serial data at input 78. The serial to parallel shift register should have a capacity of at least 16 bits to accommodate the bits in each data frame. In the preferred embodiment a pair of 54164 serial to parallel shift registers are used. As the bits arrive at input 78, they are transferred to one of 16 output pins. The clock signal from the VCO is supplied to clock input 78, and in response to the clock pulses, register 77 directs the incoming bits sequentially to selected output pins. The 90° phase delay of the clock signal insures that each data bit will have arrived at input 78 before the clock signal feeds the bit to the appropriate output pin. The initial arriving bit in each frame is supplied to output pin 80, the next fourteen bits are transferred to storage register 82 over a parallel data bus 83, and the sixteenth bit is directed to pin 84 of the serial to parallel shift register. Pins 80 and 84 connect to an AND gate 85.

Storage register 82, comprising a pair of 54198s, stores and holds the fourteen data bits until a positive signal is received at pin 86 from AND gate 85, indicating that both the trigger bit and end bit have been received by serial to prallel shift register 77. When the signal at pin 86 goes high, storage register 82 transfers the fourteen data bits to a digital to analog converter 90, for example, a DAC-HR-14B manufactured by Datel, which which acts as a display interface for an analog output. The output of digital to analog converter 90 is fed into an operational amplifier 92 which outputs a signal suitable for metering, automatic recording, or the like.

The system receiver shown in FIG. 2 produces an analog output which is updated for each data frame as it arrives over the optical cable 46. Identification and decoding of the data bits in each frame is accomplished without the need for receiving a separate clock signal from the transmitter unit of FIG. 1. Synchronization error is prevented by the long blank space which forms the largest part of each data frame. If, for example, a stray bit triggers one-shot 55, the one-shot prevents any subsequent bit from being sensed until after a delay interval of 55.8 microseconds. Thus, at most, only a single frame of data will be lost. For example, if one-shot 55 is accidentally triggered by a stray bit in the blank portion of one frame, after 55.8 microseconds it could be immediately retriggered by one of the sixteen bits in the subsequent data frame. By the following data frame, however, oneshot 55 will be triggered only by the proper initial trigger bit at the start of the frame and only a single frame will have been lost.

The method of the present invention is best described in conjunction with the operation of the above-described apparatus. The digital information to be transferred begins in a multiframe format of serial bits as it is output on line 46 from A to D converter 14 and parallel to serial shift register 25 of the system transmitter. The multiframe format includes sequential data frames with a frame interval of 120 microseconds. Each frame contains a sequence of sixteen bits having a bit frequency of 333.33 KHz. The bits include fourteen data bits containing the digital measure of analog input $V_{in}$. The data frames are assembled in serial form in parallel to serial shift register 35 and are then supplied to an optical interface, where they are encoded into a single optical signal for transfer by way of optical cable 46. The optical signal is received at optical receiver 48 in the system receiver, where it is decoded to reproduce the bits forming the data frames. There is no necessity to transmit a separate clock signal using the method of the present invention.

To retrieve the digital information from the data bits the following basic steps are performed: A clock signal is generated having a frequency substantially equal to the bit frequency of the bits in the data frames (the 333.33 KHz signal on line 66). In the preferred apparatus the clock signal is generated by the internal oscillator of VCO 50. Furthermore, the clock signal has a predetermined phase relationship with respect to the bits in the data frames (90° phase delay). The clock signal is then used by serial to parallel shift register 77 to select the data bits from the sequence of bits in each data frame. The fourteen data bits are isolated from the trigger bit and end bit in shift register 77 and the data bits are transferred to a digital to analog converter 90 by way of storage register 82. Finally, an analog output proportional to the data bits is fed to an appropriate display or recording device.

The detailed steps performed in generating the clock signal in VCO 50 include the following: The duration of each data frame is first determined. This is accomplished by first sensing any bit of the incoming signal and then delaying the sensing of any subsequent bit until after a predetermined delay interval which is shorter than one of the data frames. In the preferred embodiment, the starting bit of each data frame is detected by one-shot 55, which then delays sensing additional bits for 55.8 microseconds. The detected frames from one-shot 55 are then formed into a signal (Trace C) representing the duration of each data frame. Simultaneously, the clock signal on line 66 is used to determine measured frame intervals which are substantially equal in length to the actual frame intervals of the arriving data frames. The measured frame intervals, represented by Trace E of FIG. 3, and the sensed duration of the data frames, represented by Trace C, are fed to separate pins of the VCO. Within the VCO the measured frame intervals and sensed duration of the data frames are compared and the frequency of the clock signal output is adjusted to make the measured frame intervals substantially equal in length to the data frames. The VCO also produces a predetermined phase relationship between the clock signal and the bits, which in the preferred embodiment is a 90° phase differential.

Preferably, each data frame is more than twice as long in time as the total duration of the bits in a data frame. Trace A in FIG. 3 shows that the preferred method is to use sixteen bits with a total duration of 48 microseconds in frames of 120 microseconds duration. The delay interval (in one-shot 55) from when the first bit is sensed to when additional bits can be sensed should be less than one-half a data frame, but longer than the duration of the bits. Trace B in FIG. 3 illustrates that in the preferred embodiment the delay interval is 55.8 microseconds. Following the above guidelines, synchronization errors are rapidly corrected because the largest portion of each frame is blank and the end of each delay period, when incoming bits are again detected, will virtually always occur during the blank period. Thus, the first bit sensed after each delay interval of 55.8 microseconds will be the next trigger bit, unless the delay interval ends in the middle of the bit sequence due to accidental triggering of the one-shot 55. In that case only a single data frame will be lost and in the following frame the clock signal will be properly synchronized.

It is most advantageous to include at least one trigger bit before the data bits and an end bit after the data bits to help control the subsequent processing of the data bits. The trigger bit also helps assure that the clock signal is properly adjusted in frequency and phase before the data bits begin arriving at the serial to parallel shift register 77.

The present invention allows for the transmission of digital data in a multiframe format over a single optical cable. It eliminates the need for a second cable carrying a clock signal. The system employs a VCO at the receiving end to recreate the clock signal and the method provides a reliable means for synchronizing the clock signal to the incoming data.

Alternative embodiments are possible within the scope of the present invention. Other than practical limits on the size of the various converters employed, the system and method of the present invention can handle additional data bits for improved resolution. The frequencies of the bits and the data frames in the preferred embodiment are tailored to the components selected and could be altered as design considerations dictate.

The invention provides a data transmission system and method for transferring digital information over a single optical cable. The data transmission system and method operates in a multiframe format of serial bits which requires no separately-transmitted clock signal. The data transmission system and method provide for continuous real-time monitoring of high voltage power transmission lines from a remote location.

What is claimed is:

1. A data transmission system for transferring digital information which has been converted to a multiframe format of serial bits over a single optical cable, said multiframe format including sequential data frames each containing a sequence of bits having a predetermined bit frequency wherein the total number of said bits in each said data frame includes a predetermined number of data bits containing the digital information, the system including an optical encoder for converting the bits into a single optical signal for transfer by way of the optical cable and an optical decoder for receiving the optical signal and reproducing the bits, and means for retrieving the digital information from said data bits, comprising: clock means including a phase locked loop incorporating a variable oscillator outputting a clock signal having a frequency substantially equal to said bit frequency and means responding to said bits and said clock signal to produce a predetermined phase relationship between said clock signal and said bits, and frame decoder means for selecting said data bits from the sequence of bits in each said data frame using said clock signal, said clock means including means for sensing the duration of said data frames, and frame interval means for determining measured frame intervals using said clock signal, said clock means comparing said measured frame intervals and the sensed duration of said data frames and adjusting said variable oscillator to make said measured frame intervals substantially equal in length to said data frames and to produce said predetermined phase relationship.

2. A system as in claim 1 in which said frame interval means includes a frequency divider for receiving said clock signal and for determining said measured frame intervals therefrom.

3. A system as in claim 1 in which said clock means adjusts the frequency of said clock signal output by said variable oscillator means to produce said predetermined phase relationship between said clock signal and said bits.

4. A system as in claim 1 in which said variable oscillator means is a voltage controlled oscillator.

5. A system as in claim 1 in which the sequence of bits in each said data frame includes a predetermined number of bits, said means for sensing including trigger means responsive to any said bit, said trigger means being nonresponsive to subsequent bits until after a predetermined delay interval which is longer than the total duration of said bits in a data frame and shorter than a data frame.

6. A system as in claim 5 in which said delay interval is less than one-half as long as a data frame.

7. A system as in claim 1 in which said frame decoder means includes a serial to parallel shift register.

8. A system as in claim 7 in which the predetermined number of data bits in each said data frame is fourteen data bits and said serial to parallel shift register has a capacity exceeding fourteen bits.

9. A system as in claim 7 in which said sequence of bits in each said data frame is converted to parallel form by said serial to parallel shift register, said system further including display interface means into which said data bits are transferred in parallel form from said serial to parallel shift register.

10. A system as in claim 7 in which said display interface means includes a digital to analog converter.

11. A system as in claim 7 in which the sequence of bits in each said data frame includes a trigger bit, said predetermined number of data bits, and an end bit, and in which said data is output to said display interface means only after both said trigger bit and said end bit have been received by said serial to parallel shift register.

12. A method for transferring digital information which has been converted to a multiframe format of serial bits over a single optical cable, said multiframe format including sequential data frames each containing a sequence of bits having a predetermined bit frequency and including a predetermined number of data bits containing said digital information, the bits being encoded into a single optical signal for transfer by way of the optical cable, and the optical signal then being received and decoded to reproduce the bits, the method of retrieving the digital information from the data bits comprising: generating a clock signal having a frequency substantially equal to said bit frequency and having a predetermined phase relationship with respect to the bits, said phase relationship being attained by sensing the duration of each said data frame, determining measured frame intervals using said clock signal, comparing said measured frame intervals and the sensed duration of said data frames, and adjusting the frequency of said clock signal whereby to make said measured frame intervals substantially equal in length to said data frames and to produce said predetermined phase relationship, and using said clock signal to select said data bits from the sequence of bits in each said data frame to retrieve said digital information.

13. A method as in claim 12 in which said bits in each said data frame include at least one trigger bit preceding said data bits, the trigger bit being used to sense each said data frame to establish the duration thereof.

14. A method as in claim 12 in which the predetermined number of data bits is fourteen data bits.

15. A method as in claim 12 in which said clock signal is delayed in phase approximately ninety degrees from said bits.

16. A method as in claim 12 in which said step of sensing the duration of each said data frame includes first sensing any said bit and then delaying the sensing of any subsequent bit until after a predetermined delay interval which is shorter than a data frame.

17. A method as in claim 16 in which each said data frame includes a predetermined number of bits having a predetermined total duration, said predetermined delay interval being longer than the total duration of said bits in a data frame and shorter than a data frame.

18. A method as in claim 17 in which each said data frame is more than twice as long in time as said total duration of said bits in a data frame, and said predetermined delay interval is shorter than one-half of a data frame.

19. A method of transferring digital information which has been converted to a multiframe format of several bits over a single optical cable, said multiframe format including sequential data frames spaced from one another in time, each containing a trigger bit followed by a predetermined number of data bits containing said data information followed by an end bit said trigger and end bit together providing a unique combination as compared to either of these bits alone or in combination with any other information in the multiframe format the bits being encoded into a single optical signal for transfer by way of the optical cable, and the optical signal then being received and decoded to reproduce the bits, the method of retrieving the digital information from the data bits comprising: generating a clock signal having a frequency substantially equal to said bit frequency and having a predetermined phase relationship with respect to the bits, and using said clock signal to select said data bits from the sequence of bits in each of said frames to retrieve digital information, said last mentioned step including the step of processing the data bits for display of said digital information only after both said trigger bit and end bit as evidenced by sensing there unique combination have been transferred over said optical cable.

* * * * *